B. D. WASHBURN.
HINGE.
No. 70,299.
Patented Oct. 29, 1867.
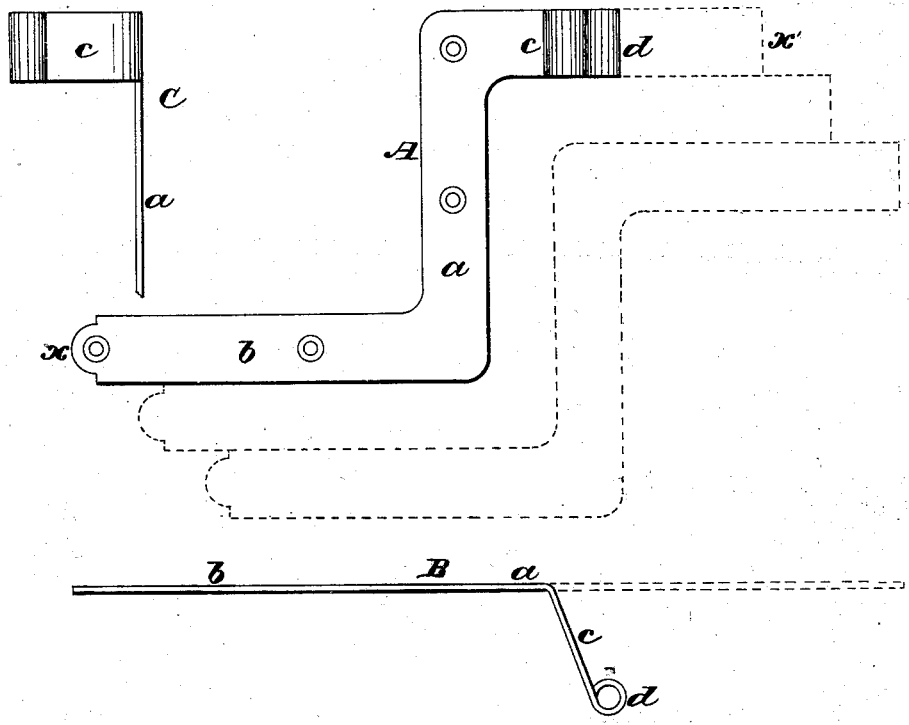

United States Patent Office.

B. D. WASHBURN, OF ROXBURY, MASSACHUSETTS.

Letters Patent No. 70,299, dated October 29, 1867.

IMPROVEMENT IN HINGES.

The Schedule referred to in these Letters Patent and making part of the same.

TO ALL WHOM IT MAY CONCERN:

Be it known that I, B. D. WASHBURN, of Roxbury, in the county of Norfolk, and State of Massachusetts, have invented an improved Blind-Hinge; and I do hereby declare that the following, taken in connection with the drawings which accompany and form part of this specification, is a description of my invention sufficient to enable those skilled in the art to practise it.

It is to that class of blind-hinges in which the metal plate applied to the blind is made up of a horizontal and a vertical arm, the eye or tube into which the stud-pin which supports the blind enters being upon another arm, projecting outwardly from the hinge-plate, that the invention relates.

In the construction of this hinge-plate, the practice has always been, before my invention, to weld the parts or members together, either joining the horizontal arm to the vertical arm, or the projecting stud-plate to such vertical arm in this manner. Hinge-plates having such construction are objectionable, in that the welding is apt to be imperfectly effected, or in that the horizontal arm is not always set at a proper angle to the vertical one, and the object of my invention has been to form the whole hinge-plate integral, or in one piece, without waste of metal, and without any weld or joint.

To accomplish this, I select the best quality of plate iron, and cut or stamp the blanks out, giving to the respective arms the proper relative angle or disposition (in the same plane) in the process of cutting, the outward bend of the stud-receiving arm, and the formation of the eye or tube therein, being subsequently imparted.

It is in a blind-hinge plate having this construction that my invention consists, and the drawings represent the embodiment of the same, A showing a face view, B a top view, and C a side view of the hinge.

$a$ denotes the vertical arm, from which springs the lateral arm $b$, and also the outwardly-projecting arm $c$, at the end of which is formed the eye or tube $d$, by which the blind is hung to the stud or pin, for supporting the blind and allowing it to be opened and closed. Selecting for the manufacture of the hinge-plates the best quality of plate metal, and having this of a width corresponding (or approximately so) to the length from one point $x$ of the hinge to the other point $x'$, when the hinge-plate or blank is in a plane or unbent form, (measured in a right line from point to point,) I introduce the sheet of metal endwise into a cutter or die-press, the edges of the dies or cutters in which are of the exact form to be given to the edge of the hinge-plate, as denoted by the red lines at $a$, these red lines representing a succession of cuts produced in the press. The dies or cutters being of course of true shape, the hinge-blanks or plates will be cut out with exact uniformity of shape, and with the arms $b$ and $c$ in every plate disposed at exact right angles with the vertical piece $a$, while the hinge will have no weakness consequent upon any welding or artificial joining of one part to the other. After the hinge is so severed from the sheet of metal, the arm $c$ is bent out, and its end formed into the eye or tube $d$.

I claim as a new article of manufacture, a blind-hinge formed of the three parts or members $a\ b\ c$, when these (having the relative arrangement or disposition as shown) are cut in one piece from sheet metal, substantially as set forth.

B. D. WASHBURN.

Witnesses:
F. GOULD,
S. B. KIDDER.